United States Patent
Zhang et al.

(10) Patent No.: US 9,769,732 B2
(45) Date of Patent: Sep. 19, 2017

(54) WIRELESS NETWORK CONNECTION ESTABLISHMENT METHOD AND TERMINAL DEVICE

(71) Applicant: Huawei Device Co., Ltd., Shenzhen (CN)

(72) Inventors: Feilong Zhang, Shenzhen (CN); Cunzhi Fan, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 305 days.

(21) Appl. No.: 14/493,549

(22) Filed: Sep. 23, 2014

(65) Prior Publication Data

US 2015/0009862 A1 Jan. 8, 2015

Related U.S. Application Data

(63) Continuation of application No. PCT/CN2013/070013, filed on Jan. 4, 2013.

(30) Foreign Application Priority Data

Mar. 27, 2012 (CN) .......................... 2012 1 0084775

(51) Int. Cl.
*H04W 48/14* (2009.01)
*H04W 76/02* (2009.01)
(Continued)

(52) U.S. Cl.
CPC .......... *H04W 48/14* (2013.01); *H04B 5/0031* (2013.01); *H04W 4/008* (2013.01);
(Continued)

(58) Field of Classification Search
CPC ..... H04W 76/02; H04W 48/14; H04W 4/008; H04W 4/001; H04B 5/0031; H04L 67/10; H04L 67/125
See application file for complete search history.

(56) References Cited

U.S. PATENT DOCUMENTS

2006/0258289 A1 11/2006 Dua
2007/0115898 A1* 5/2007 Stein .................. H04L 63/0272
370/338
(Continued)

FOREIGN PATENT DOCUMENTS

CN 101185253 A 5/2008
CN 101860935 A 10/2010
(Continued)

OTHER PUBLICATIONS

Foreign Communication From a Counterpart Application, PCT Application No. PCT/CN2013/070013, English Translation of International Search Report dated Apr. 11, 2013, 2 pages.
(Continued)

*Primary Examiner* — Anez Ebrahim
(74) *Attorney, Agent, or Firm* — Conley Rose, P.C.

(57) ABSTRACT

A wireless network connection establishment method and a terminal device are provided. In the embodiments of the present invention, a first terminal device obtains wireless network information that is used to join a wireless network on which the first terminal device is located, and sends the wireless network information to a second terminal device in a near field communication (NFC) manner, so that the first terminal device can receive a first request message that is sent by the second terminal device according to the wireless network information, and establish a wireless network connection to the second terminal device according to the first request message. With NFC characteristics, such as convenient communication, a short communication distance, and high reliability, a problem in the prior art that a configuration operation is complex and error-prone is avoided, thereby improving configuration efficiency and reliability.

18 Claims, 5 Drawing Sheets

(51) Int. Cl.
  *H04B 5/00* (2006.01)
  *H04W 4/00* (2009.01)
  *H04W 88/02* (2009.01)
  *H04W 48/16* (2009.01)
  *H04W 88/06* (2009.01)

(52) U.S. Cl.
  CPC ............ *H04W 76/02* (2013.01); *H04W 48/16* (2013.01); *H04W 88/02* (2013.01); *H04W 88/06* (2013.01)

(56) References Cited

U.S. PATENT DOCUMENTS

| | | | |
|---|---|---|---|
| 2008/0058031 A1* | 3/2008 | Deprun | H04W 52/0229 455/574 |
| 2010/0254349 A1 | 10/2010 | Aibara et al. | |
| 2011/0039494 A1 | 2/2011 | Shon et al. | |
| 2011/0275316 A1 | 11/2011 | Suumaki et al. | |
| 2011/0319016 A1 | 12/2011 | Gormley et al. | |
| 2012/0044354 A1* | 2/2012 | Cheng | H04N 5/23203 348/159 |
| 2012/0214414 A1 | 8/2012 | Abel et al. | |

FOREIGN PATENT DOCUMENTS

| | | |
|---|---|---|
| CN | 101997575 A | 3/2011 |
| CN | 102026322 A | 4/2011 |

OTHER PUBLICATIONS

Foreign Communication From a Counterpart Application, PCT Application No. PCT/CN2013/070013, English Translation of Written Opinion dated Apr. 11, 2013, 15 pages.

"Wi-Fi Protected Setup Specification," Wi-Fi Alliance, Version 1.0h, Retrieved From the Internet: URL: cfile28.uf.tistory.com/attach/16132E3C50FCFFCB3EC74E on Jun. 26, 2012, Dec. 31, 2006, 110 pages.

Foreign Communication From a Counterpart Application, European Application No. 13768263.9, Extended European Search Report dated Mar. 26, 2015, 8 pages.

* cited by examiner

WIRELESS NETWORK CONNECTION ESTABLISHMENT METHOD AND TERMINAL DEVICE

CROSS-REFERENCE TO RELATED APPLICATIONS

This application is a continuation of International Application PCT/CN2013/070013, filed on Jan. 4, 2013, which claims priority to Chinese Patent Application No. 201210084775.2, filed on Mar. 27, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to radio communications technologies, and in particular, to a wireless network connection establishment method and a terminal device.

BACKGROUND

In a process of establishing a wireless network connection, an access device of a wireless network and a client (that is, a terminal device) of the wireless network need to be configured. For example, in a process of establishing a Wireless Fidelity (Wi-Fi) network, a Wi-Fi access point (AP) and a Wi-Fi client need to be configured. In the prior art, the access device and the terminal device of the wireless network may be configured by entering wireless network information, for example, a network name, an encryption manner, and a password of the wireless network, on a configuration page.

However, the foregoing configuration operation is complex and error-prone, thereby decreasing configuration efficiency and reliability.

SUMMARY

The present invention provides a wireless network connection establishment method and a terminal device, so as to improve configuration efficiency and reliability.

One aspect provides a wireless network connection establishment method, including: obtaining, by a first terminal device, wireless network information, where the wireless network information is used to join a wireless network on which the first terminal device is located, and an AP of the wireless network on which the first terminal device is located is the first terminal device; sending, by the first terminal device, the wireless network information to a second terminal device in a near field communication (NFC) manner; and receiving, by the first terminal device, a first request message that is sent by the second terminal device according to the wireless network information, and establishing a wireless network connection to the second terminal device according to the first request message.

Another aspect provides a wireless network connection establishment method, including: receiving, by a second terminal device, wireless network information that is sent by a first terminal device in an NFC manner, where the wireless network information is used to join a wireless network on which the first terminal device is located, and an AP of the wireless network on which the first terminal device is located is the first terminal device; and sending, by the second terminal device, a first request message to the first terminal device according to the wireless network information, so that the first terminal device establishes a wireless network connection to the second terminal device according to the wireless network information.

Another aspect provides a terminal device, including a first processor, a first NFC communicator and a first radio frequency device, where the first processor is configured to obtain wireless network information, where the wireless network information is used to join a wireless network on which the terminal device is located, and an AP of the wireless network on which the terminal device is located is the terminal device; and establish a wireless network connection between the first radio frequency device and a second terminal device according to a first request message sent by the second terminal device; the first NFC communicator is configured to send the wireless network information to the second terminal device in an NFC manner; and the first radio frequency device is configured to receive the first request message that is sent by the second terminal device according to the wireless network information.

Another aspect provides a terminal device, including a second processor, a second NFC communicator and a second radio frequency device, where the second NFC communicator is configured to receive wireless network information that is sent by a first terminal device in an NFC manner, where the wireless network information is used to join a wireless network on which the first terminal device is located, and an AP of the wireless network on which the first terminal device is located is the first terminal device; the second processor is configured to generate a first request message according to the wireless network information; and the second radio frequency device is configured to send the first request message to the first terminal device, so that the first terminal device establishes a wireless network connection between the second radio frequency device and the first terminal device according to the wireless network information.

It can be learned from the foregoing technical solutions that, in the embodiments of the present invention, a first terminal device obtains wireless network information that is used to join a wireless network on which the first terminal device is located, and sends the wireless network information to a second terminal device in an NFC manner, so that the first terminal device can receive a first request message that is sent by the second terminal device according to the wireless network information, and establish a wireless network connection to the second terminal device according to the first request message. With NFC characteristics, such as convenient communication, a short communication distance, and high reliability, a problem in the prior art that a configuration operation is complex and error-prone is avoided, thereby improving configuration efficiency and reliability.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

It should be noted that a wireless network involved in the embodiments of the present invention may include but is not limited to a Wi-Fi network, a Bluetooth® network, or another wireless communications network, which is not limited by the present invention.

It should be noted that a first terminal device involved in the embodiments of the present invention serves as an AP of the wireless network, and a second terminal device and a third terminal device serve as clients of the wireless network.

It should be noted that the first terminal device, the second terminal device, and the third terminal device involved in the embodiments of the present invention include but are not limited to a mobile phone, a personal digital assistant (PDA), a wireless handheld device, a personal computer, a Moving Pictures Expert Group Audio Layer III (MP3) player or a Moving Pictures Expert Group 4 (MP4) player, which is not limited by the present invention.

The first terminal device mentioned above may further include a home gateway device, for example, a Wi-Fi AP, a broadband router, or an asymmetric digital subscriber line (ADSL) router.

Figure 1:
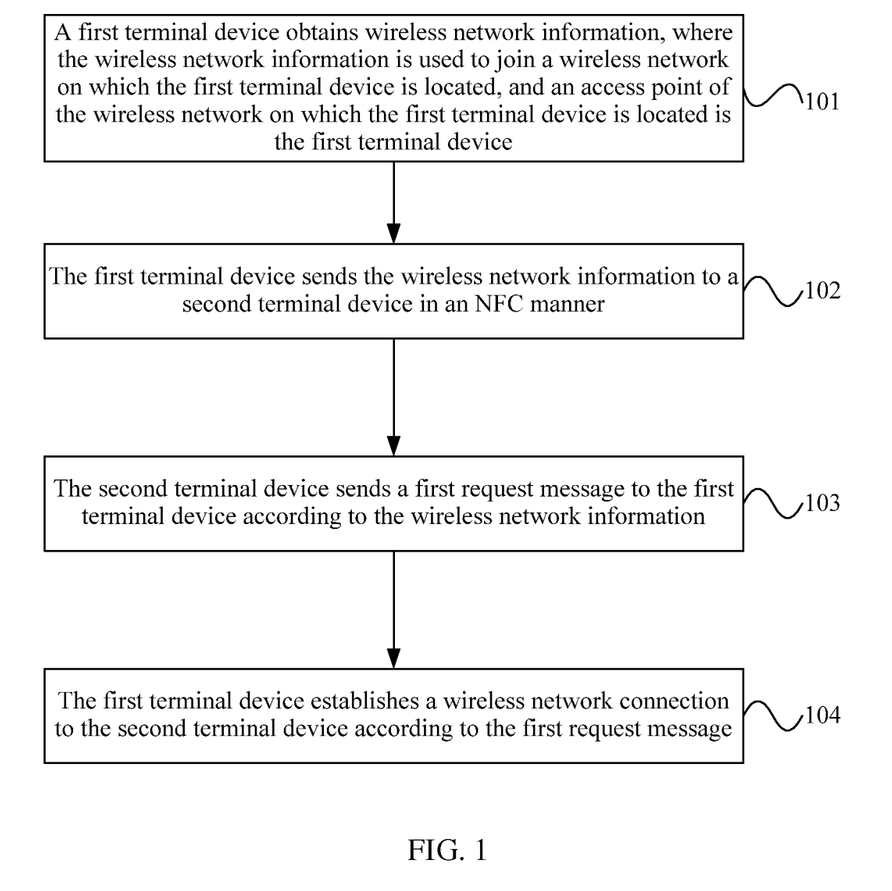
FIG. 1 is a schematic flowchart of a wireless network connection establishment method according to an embodiment of the present invention.

FIG. 1 is a schematic flowchart of a wireless network connection establishment method according to an embodiment of the present invention. As shown in FIG. 1, the wireless network connection establishment method in this embodiment may include:

101. A first terminal device obtains wireless network information, where the wireless network information is used to join a wireless network on which the first terminal device is located, and an AP of the wireless network on which the first terminal device is located is the first terminal device.

102. The first terminal device sends the wireless network information to a second terminal device in an NFC manner.

103. The second terminal device sends a first request message to the first terminal device according to the wireless network information.

104. The first terminal device establishes a wireless network connection to the second terminal device according to the first request message.

The wireless network information may include but is not limited to a network name of the wireless network or an AP address of the wireless network. Optionally, the wireless network information may further include but is not limited to an encryption manner and a password.

If the wireless network information includes an encryption manner and a password, after step 103, the first terminal device and the second terminal device may further execute an authentication process, which can further improve security.

In an optional implementation manner of this embodiment, in step 101, the first terminal device may obtain wireless network information that is generated by the first terminal device in real time. This manner of generating wireless network information in real time is more secure and reliable, and can effectively prevent an unauthorized user from joining a wireless network.

In another optional implementation manner of this embodiment, in step 101, the first terminal device may obtain wireless network information that is stored on the first terminal device, where the wireless network information may be stored after being generated by the first terminal device.

In an optional implementation manner of this embodiment, in step 103, the second terminal device may obtain an AP address of the wireless network according to a network name of the wireless network, generate a first request message, and then send the first request message to the first terminal device. It can be understood that the first request message is sent by using a wireless communications protocol such as Wi-Fi.

NFC, which may also be referred to as short-distance wireless communication, is a short-distance high frequency wireless communications technology, and allows non-contact point-to-point data transmission between terminal devices and data transmission within an NFC range (for example, less than 20 centimeters). A terminal device first needs to enable an application function option of NFC, so that the terminal device can transmit data within an NFC range (for example, less than 20 centimeters). In this embodiment, an application function option of NFC may be enabled in two manners. One is NFC active mode: a terminal device actively enables an application function option of NFC; and the other is NFC passive mode: an application function option of NFC is passively enabled on a terminal device according to triggering by one or more other terminal devices.

In an optional implementation manner of this embodiment, in step 102, the first terminal device is in an NFC active mode, and the second terminal device is in an NFC passive mode. First, the first terminal device may enable an application function option of NFC; and then, when a distance between the first terminal device and the second terminal device falls within an NFC range (for example, less than 20 centimeters), the first terminal device may send a first activation indication to the second terminal device, so that the second terminal device enables an application function option of NFC according to the first activation indication, and the first terminal device sends the wireless network information to the second terminal device in an NFC manner.

In an optional implementation manner of this embodiment, in step 102, the first terminal device is in an NFC passive mode, and the second terminal device is in an NFC active mode. First, the second terminal device may enable an application function option of NFC; then, when a distance between the first terminal device and the second terminal device falls within an NFC range (for example, less than 20 centimeters), the first terminal device may receive a second activation indication sent by the second terminal device; and then the first terminal device enables an application function option of NFC according to the second activation indication, so that the first terminal device sends the wireless network information to the second terminal device in an NFC manner.

In an optional implementation manner of this embodiment, after step 102, the first terminal device and the second terminal device may further disable the enabled application function option of NFC, which can effectively reduce power consumption of the terminal devices.

In an optional implementation manner of this embodiment, to perform security authentication on the second terminal device that requests joining the wireless network on which the first terminal device is located, before step 103, the second terminal device may further send identifier information of the second terminal device to the first terminal device in an NFC manner, so that the first terminal device may add the identifier information of the second terminal device to a whitelist. Accordingly, in step 103, the first request message that is sent by the second terminal device to the first terminal device may further include the identifier information of the second terminal device, so that the first terminal device performs matching in the whitelist according to the identifier information of the second terminal device, and when the matching succeeds, establishes a wireless network connection to the second terminal device according to the wireless network information, which can effectively improve configuration security.

The identifier information of the second terminal device may include but is not limited to a Media Access Control (MAC) address of the second terminal device.

In an optional implementation manner of this embodiment, after step 102, the second terminal device may further send the wireless network information to a third terminal device in an NFC manner. Accordingly, the first terminal device may further receive a second request message that is sent by the third terminal device according to wireless network information, and establish a wireless network connection to the third terminal device according to the wireless network information, where the second request message is the wireless network information that is obtained by the third terminal device from the second terminal device in an NFC manner.

In an optional implementation manner of this embodiment, to perform security authentication on the third terminal device that requests joining the wireless network on which the first terminal device is located, the first terminal device may further receive identifier information of the third terminal device that is sent by the third terminal device in an NFC manner, and add the identifier information of the third terminal device to a whitelist. Specifically, the third terminal device sends the identifier information of the third terminal device to the second terminal device in the NFC manner, and then the second terminal device sends the identifier information of the third terminal device to the first terminal device by means of a wireless network connection to the first terminal device or in an NFC manner. Accordingly, the second request message received by the first terminal device may further include the identifier information of the third terminal device, so that the first terminal device performs matching in the whitelist according to the identifier information of the third terminal device, and when the matching succeeds, establishes a wireless network connection to the third terminal device according to the wireless network information, which can effectively improve configuration security.

In an optional implementation manner of this embodiment, for some reasons, the first terminal device needs to exit the wireless network on which the first terminal device (that is, the original first terminal device) is located. For example, for a reason that remaining power of the first terminal device is less than 20%, the first terminal device may further send a network capability collection instruction to one or more other terminal devices, that is, the second terminal device and/or the third terminal device, on the wireless network on which the first terminal device is located, and then the second terminal device and/or the third terminal device may send respective wireless network capability information to the first terminal device according to the network capability collection instruction; then, the first terminal device receives the wireless network capability information of the second terminal device and/or the third terminal device that is sent by the second terminal device and/or the third terminal device to the first terminal device according to the instruction, so that the first terminal device can determine, according to the wireless network capability information, that either the second terminal device or the third terminal device serves as a new first terminal device, where the new first terminal device serves as a new AP, that is, replacing the first terminal device to be the new AP of the wireless network. The first terminal device sends indication information to the second terminal device and/or the third terminal device, where the indication information is used to instruct the one or more other terminal devices to establish a wireless network connection to the new first terminal device.

The second terminal device is used as an example. After the second terminal device receives an indication message sent by the first terminal device; if it is determined that the second terminal device is a new AP, the second terminal device establishes a wireless network connection to one or more other terminal devices on the wireless network according to the indication message; and if it is determined that the one or more other terminal devices except the second terminal device is a new AP, the second terminal device establishes, according to the indication message, a wireless network connection to the terminal device that is determined as the new AP.

It can be understood that a device type of the new first terminal device may be the same as or different from a device type of the original first terminal device, which is not limited by this embodiment. The new first terminal device may repeatedly execute all steps executed by the original first terminal device in this embodiment. For details, reference may be made to the foregoing content, which is not repeatedly described herein. The original first terminal device selects a new terminal device from the second terminal device and/or the third terminal device, and indicates to the new first terminal device that is selected by the original first terminal device from the one or more other terminal devices (that is, the second terminal device and/or the third terminal device), so that the new first terminal device may re-execute steps executed by the original first terminal device, and replace the original first terminal device to establish a wireless network connection to the second terminal device and/or the third terminal device, which can further improve configuration security effectively.

In this embodiment, a first terminal device obtains wireless network information that is used to join a wireless network on which the first terminal device is located, and sends the wireless network information to a second terminal device in an NFC manner, so that the first terminal device can receive a first request message that is sent by the second terminal device according to the wireless network information, and establish a wireless network connection to the second terminal device according to the first request message. With NFC characteristics, such as convenient communication, a short communication distance, and high reliability, a problem in the prior art that a configuration operation is complex and error-prone is avoided, thereby improving configuration efficiency and reliability.

To describe the method provided by the embodiment of the present invention more clearly, the following uses a Wi-Fi network as an example, where a terminal A serves as a Wi-Fi AP, and a terminal B and a terminal C serve as Wi-Fi clients.

Figure 2:
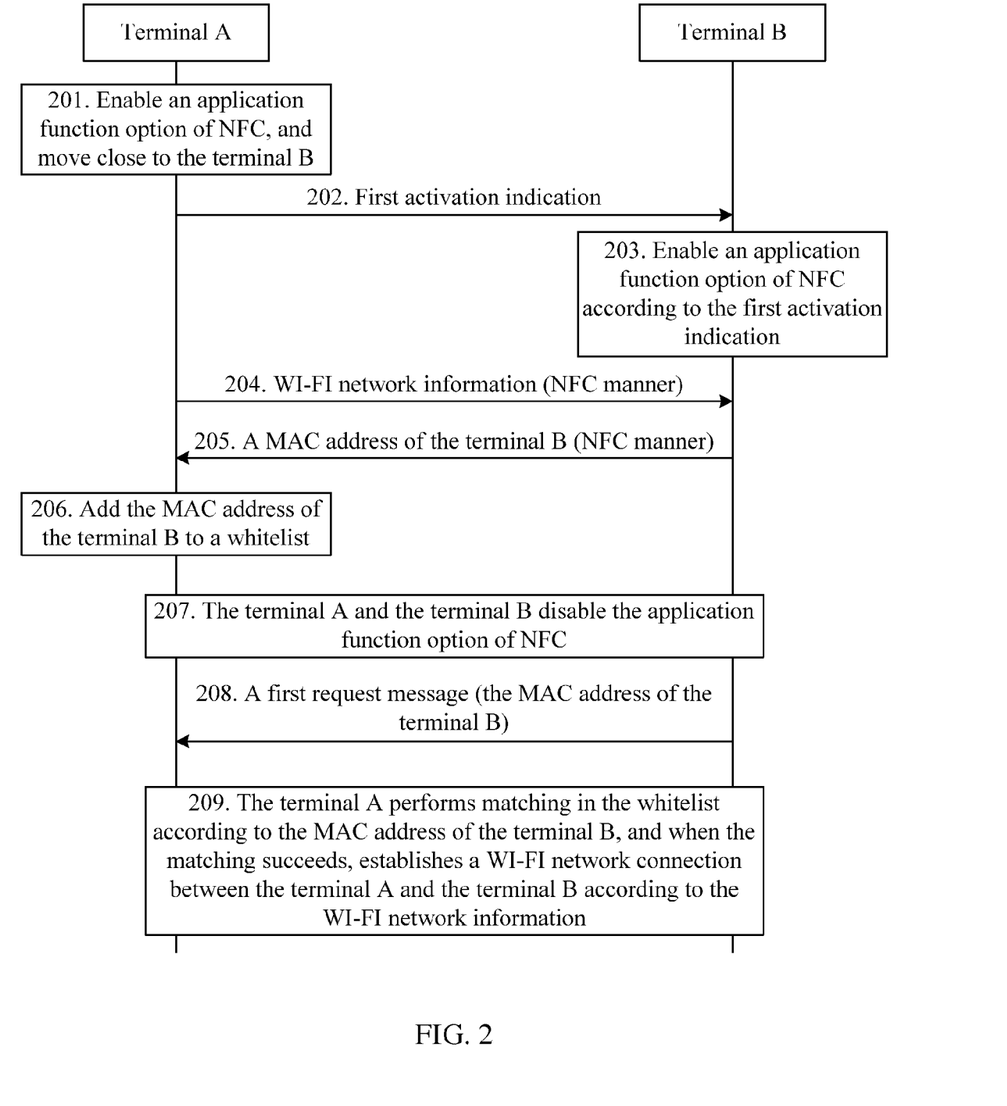
FIG. 2 is a schematic flowchart of a wireless network connection establishment method according to another embodiment of the present invention.

FIG. 2 is a schematic flowchart of a wireless network connection establishment method according to another embodiment of the present invention. In this embodiment, the terminal A is in an NFC active mode, and the terminal B is in an NFC passive mode. As shown in FIG. 2, the wireless network connection establishment method in this embodiment may include:

201. The terminal A enables an application function option of NFC, and moves close to the terminal B.

202. When a distance between the terminal A and the terminal B falls within an NFC range (for example, less than 20 centimeters), the terminal A sends a first activation indication to the terminal B.

203. The terminal B enables an application function option of NFC according to the first activation indication.

204. The terminal A sends, to the terminal B in an NFC manner, Wi-Fi network information obtained by the terminal A.

205. The terminal B sends a MAC address of the terminal B to the terminal A in an NFC manner.

206. The terminal A adds the MAC address of the terminal B to a whitelist.

207. The terminal A and the terminal B disable the application function option of NFC.

208. The terminal B sends a first request message to the terminal A according to the Wi-Fi network information, where the first request message includes the MAC address of the terminal B.

209. The terminal A performs matching in the whitelist according to the MAC address of the terminal B, and when the matching succeeds, establishes a Wi-Fi network connection between the terminal A and the terminal B according to the Wi-Fi network information.

In this embodiment, a terminal A obtains Wi-Fi network information that is used to join a Wi-Fi network on which the terminal A is located, and then the terminal A sends the Wi-Fi network information to a terminal B in an NFC manner, so that the terminal A can receive a request message that is sent by the terminal B according to the Wi-Fi network information, and establish a Wi-Fi network connection between the terminal A and the terminal B, and a Wi-Fi network connection between the terminal A and a terminal C according to the request message. With NFC characteristics, such as convenient communication, a short communication distance, and high reliability, a problem in the prior art that a configuration operation is complex and error-prone is avoided, thereby improving configuration efficiency and reliability.

Figure 3:
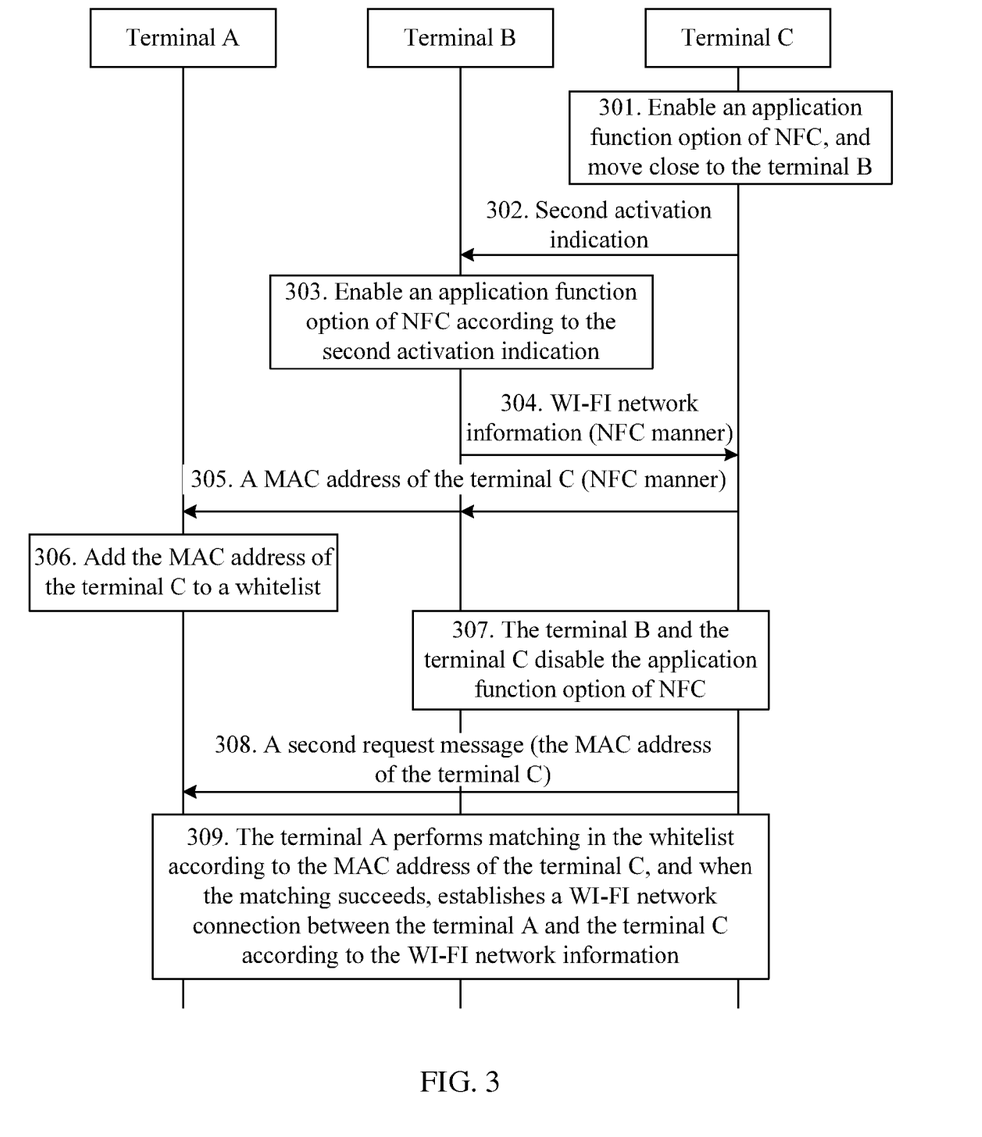
FIG. 3 is a schematic flowchart of a wireless network connection establishment method according to another embodiment of the present invention.

FIG. 3 is a schematic flowchart of a wireless network connection establishment method according to another embodiment of the present invention. In this embodiment, a terminal C is in an NFC active mode, and a terminal B is in an NFC passive mode. As shown in FIG. 3, the wireless network connection establishment method in this embodiment may include:

301. The terminal C enables an application function option of NFC, and moves close to the terminal B.

302. When a distance between the terminal C and the terminal B falls within an NFC range (for example, less than 20 centimeters), the terminal C sends a second activation indication to the terminal B.

303. The terminal B enables an application function option of NFC according to the second activation indication.

304. The terminal B sends, to the terminal C in an NFC manner, Wi-Fi network information obtained by the terminal B.

The terminal B obtains the Wi-Fi network information by executing a related procedure in the embodiment corresponding to FIG. 2. For detailed description, reference may be made to the embodiment corresponding to FIG. 2, which is not repeatedly described herein.

305. The terminal C sends a MAC address of the terminal C to a terminal A by using the terminal B in an NFC manner.

306. The terminal A adds the MAC address of the terminal C to a whitelist.

307. The terminal B and the terminal C disable the application function option of NFC.

308. The terminal C sends a second request message to the terminal A according to the Wi-Fi network information, where the second request message includes the MAC address of the terminal C.

309. The terminal A performs matching in the whitelist according to the MAC address of the terminal C, and when the matching succeeds, establishes a Wi-Fi network connection between the terminal A and the terminal C according to the Wi-Fi network information.

In this embodiment, a terminal A obtains Wi-Fi network information that is used to join a Wi-Fi network on which the terminal A is located, and then the terminal A sends the Wi-Fi network information to a terminal B in an NFC manner, and the terminal B sends the Wi-Fi network information to a terminal C in an NFC manner, so that the terminal A can receive a request message that is sent by the terminal C according to the Wi-Fi network information, and establish a Wi-Fi network connection between the terminal A and the terminal C according to the request message. With NFC characteristics, such as convenient communication, a short communication distance, and high reliability, a problem in the prior art that a configuration operation is complex and error-prone is avoided, thereby improving configuration efficiency and reliability.

Figure 4:
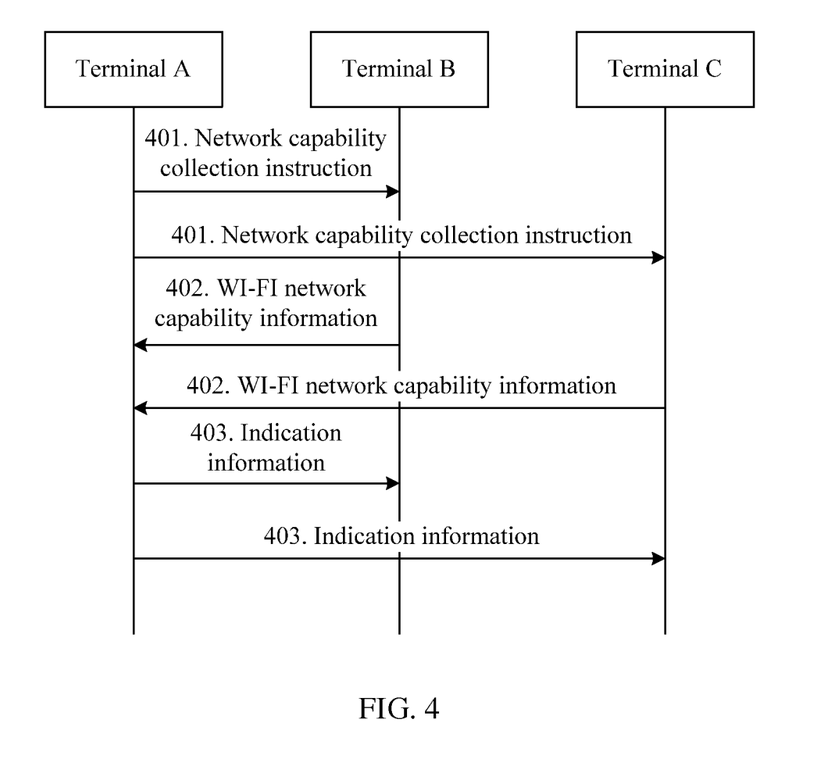
FIG. 4 is a schematic flowchart of a wireless network connection establishment method according to another embodiment of the present invention.

FIG. 4 is a schematic flowchart of a wireless network connection establishment method according to another embodiment of the present invention. In this embodiment, a terminal C is in an NFC active mode, and a terminal B is in an NFC passive mode; and for some reasons, a terminal A needs to exit a Wi-Fi network on which the terminal A is located. As shown in FIG. 4, the wireless network connection establishment method in this embodiment may include:

401. The terminal A sends a network capability collection instruction to the terminal B and the terminal C.

402. The terminal B and the terminal C send respective Wi-Fi network capability information to the terminal A according to the network capability collection instruction.

403. The terminal A determines, according to the Wi-Fi network capability information, that one terminal device serves as a new terminal A, for example, selects the terminal C as a new terminal A, and the terminal A sends indication information to the terminal B and the terminal C, where the indication information is used to instruct the terminal B to establish a Wi-Fi network connection to the terminal C.

Therefore, the terminal C as a new terminal A may execute operations of the terminal A in the embodiments corresponding to FIG. 2 and FIG. 3. For detailed description, reference may be made to the embodiments corresponding to FIG. 2 and FIG. 3, which are not repeatedly described herein.

In this embodiment, for some reasons, a terminal A needs to exit a Wi-Fi network on which the terminal A is located. The terminal A sends a network capability collection instruction to a terminal B and a terminal C, so that the terminal B and the terminal C can send respective Wi-Fi network capability information to the terminal A according to the network capability collection instruction, and the terminal A selects one terminal device as a new terminal A according to the Wi-Fi network capability information, thereby further improving configuration efficiency and reliability.

It should be noted that, for ease of description, the foregoing method embodiments are described as a series of action combinations. However, persons skilled in the art should understand that the present invention is not limited to the described sequence of the actions, because according to the present invention, some steps may be performed in another sequence or performed at the same time. In addition, persons skilled in the art should also understand that the embodiments described in the specification all belong to exemplary embodiments, and the involved actions and modules are not necessarily mandatory to the present invention.

In the foregoing embodiments, the description of each embodiment has its emphasis, and for a part that is not described in detail in an embodiment, reference may be made to the relevant description of other embodiments.

Figure 5:
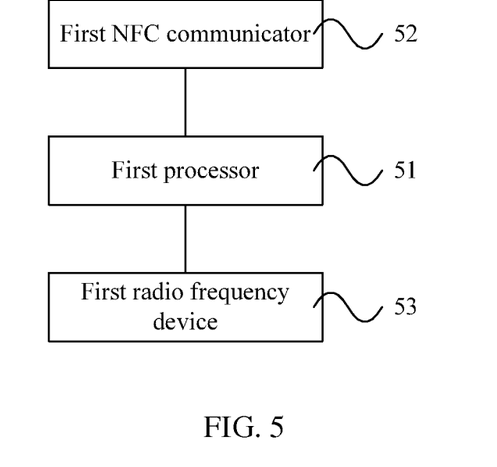
FIG. 5 is a schematic structural diagram of a terminal device according to another embodiment of the present invention.

FIG. 5 is a schematic structural diagram of a terminal device according to another embodiment of the present invention. As shown in FIG. 5, the terminal device in this embodiment includes a first processor 51, a first NFC communicator 52 and a first radio frequency device 53. The first processor 51 is configured to obtain wireless network information, where the wireless network information is used to join a wireless network on which the terminal device is located, and an AP of the wireless network on which the terminal device is located is the terminal device; and establish a wireless network connection between the first radio frequency device 53 and a second terminal device according to a first request message sent by the second terminal device; the first NFC communicator 52 is configured to send the wireless network information to the second terminal device in an NFC manner; and the first radio frequency device 53 is configured to receive the first request message that is sent by the second terminal device according to the wireless network information.

In an optional implementation manner of this embodiment, to perform security authentication on the second terminal device that requests joining the wireless network on which the terminal device is located, the first NFC communicator 52 may be further configured to receive identifier information of the second terminal device that is sent by the second terminal device in an NFC manner; the first processor 51 may be further configured to add the identifier information of the second terminal device to a whitelist; the first request message may further include the identifier information of the second terminal device; and accordingly, the first processor 51 may specifically perform matching in the whitelist according to the identifier information of the second terminal device, and when the matching succeeds, establish a wireless network connection to the second terminal device according to the first request message, which can effectively improve configuration security.

The identifier information of the second terminal device may include but is not limited to a MAC address of the second terminal device.

In an optional implementation manner of this embodiment, the first radio frequency device 53 may be further configured to receive a second request message that is sent by a third terminal device according to the wireless network information, where the wireless network information is obtained by the third terminal device from the second terminal device in an NFC manner; and the first processor 51 may be further configured to establish a wireless network connection to the third terminal device according to the second request message.

In an optional implementation manner of this embodiment, for some reasons, the terminal device needs to exit the wireless network on which the terminal device (that is, an original terminal device) is located. For example, for a reason that remaining power of the terminal device is less than 20%, the first radio frequency device 53 may be further configured to send a network capability collection instruction to one or more other terminal devices on the wireless network on which the first radio frequency device 53 is located; and receive respective wireless network capability information that is sent by the one or more other terminal devices according to the network capability collection instruction; and send indication information generated by the processor to the one or more other terminal devices; the first processor 51 may be further configured to determine, according to the wireless network capability information, that one terminal device serves as a new terminal device and the new terminal device serves as a new AP; and generate the indication information, where the indication information is used to instruct the one or more other terminal devices to establish a wireless network connection to the new terminal device.

In an optional implementation manner of this embodiment, the first processor 51 may specifically obtain wireless network information that is generated by the terminal device in real time. This manner of generating wireless network information in real time is more secure and reliable, and can effectively prevent an unauthorized user from joining a wireless network.

In an optional implementation manner of this embodiment, the first processor 51 may specifically obtain wireless network information that is stored on the terminal device, where the wireless network information is stored after being generated by the terminal device.

The wireless network information may include but is not limited to a network name of a wireless network or an AP address of a wireless network. Optionally, the wireless network information may further include but is not limited to an encryption manner and a password.

It should be noted that the first processor involved in this embodiment may be a microprocessor.

In this embodiment, a terminal device obtains, by using a first processor, wireless network information that is used to join a wireless network on which the terminal device is located, and then a first NFC communicator sends the wireless network information to a second terminal device in an NFC manner, so that a first radio frequency device can receive a first request message that is sent by the second terminal device according to the wireless network information, and the first processor establishes a wireless network connection between the first radio frequency device and the second terminal device according to the first request message. With NFC characteristics, such as convenient communication, a short communication distance, and high reliability, a problem in the prior art that a configuration operation is complex and error-prone is avoided, thereby improving configuration efficiency and reliability.

Figure 6:
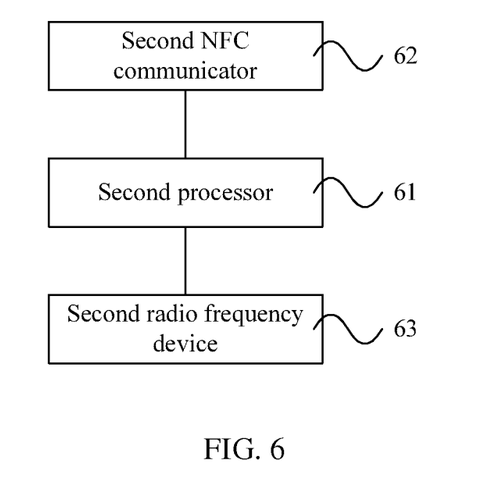
FIG. 6 is a schematic structural diagram of a terminal device according to another embodiment of the present invention.

FIG. 6 is a schematic structural diagram of a terminal device according to another embodiment of the present invention. As shown in FIG. 6, the terminal device in this embodiment includes a second processor 61, a second NFC communicator 62 and a second radio frequency device 63. The second NFC communicator 62 is configured to receive wireless network information that is sent by a first terminal device in an NFC manner, where the wireless network information is used to join a wireless network on which the first terminal device is located, and an AP of the wireless network on which the terminal device is located is the terminal device; the second processor 61 is configured to generate a first request message according to the wireless network information; and the second radio frequency device 63 is configured to send the first request message to the first terminal device, so that the first terminal device establishes a wireless network connection between the second radio frequency device 63 and the first terminal device according to the wireless network information.

The wireless network information may include but is not limited to a network name of a wireless network or an AP address of a wireless network. Optionally, the wireless network information may further include but is not limited to an encryption manner and a password.

In an optional implementation manner of this embodiment, to perform security authentication on the second terminal device that requests joining the wireless network on which the terminal device is located, the second NFC communicator 62 may be further configured to send identifier information of the terminal device to the first terminal device in an NFC manner, so that the first terminal device adds the identifier information of the terminal device to a whitelist; the first request message further includes the identifier information of the terminal device, so that the first terminal device performs matching in the whitelist according to the identifier information of the terminal device, and when the matching succeeds, establishes a wireless network connection to the terminal device according to the first request message, which can effectively improve configuration security.

The identifier information of the second terminal device may include but is not limited to a MAC address of the second terminal device.

In an optional implementation manner of this embodiment, the second NFC communicator 62 may be further configured to send the wireless network information to a third terminal device in an NFC manner, so that the first terminal device receives a second request message that is sent by the third terminal device according to the wireless network information, and establishes a wireless network connection to the third terminal device according to the second request message.

In an optional implementation manner of this embodiment, for some reasons, the first terminal device needs to exit the wireless network on which the first terminal device (that is, an original first terminal device) is located. For example, for a reason that remaining power of the first terminal device is less than 20%, the second radio frequency device 63 may be further configured to receive a network capability collection instruction sent by the first terminal device; and send wireless network capability information that is obtained by the second processor 61 to the first terminal device; and receive indication information sent by the first terminal device, where the indication information is sent after the first terminal device determines, according to the received wireless network capability information, that one terminal device serves as a new first terminal device, and the new first terminal device serves as a new AP; and the second processor 61 may be further configured to obtain wireless network capability information of the terminal device according to the network capability collection instruction; if it is determined that the terminal device is a new AP, establish a wireless network connection to one or more other terminal devices on the wireless network according to an indication message; and if it is determined that the one or more other terminal devices except the terminal device is a new AP, establish, according to the indication message, a wireless network connection to the terminal device that is determined as the new AP.

It should be noted that the second processor involved in this embodiment may be a microprocessor.

In this embodiment, a terminal device receives, by using a second NFC communicator, wireless network information that is sent by a first terminal device in an NFC manner and is used to join a wireless network on which the first terminal device is located, and then a second processor generates a first request message according to the wireless network information, and a second radio frequency device sends the first request message to the first terminal device, so that the first terminal device establishes a wireless network connection between the second radio frequency device and the first terminal device according to the first request message. With NFC characteristics, such as convenient communication, a short communication distance, and high reliability, a problem in the prior art that a configuration operation is complex and error-prone is avoided, thereby improving configuration efficiency and reliability.

It may be clearly understood by persons skilled in the art that, for ease and brevity of description, for a specific working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware and a software functional unit.

The foregoing integrated unit that is implemented in a form of a software functional unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A wireless network connection establishment method, comprising:
obtaining, by a first terminal device, wireless network information, wherein the wireless network information is used to join a wireless network on which the first terminal device is located, and wherein an access point of the wireless network on which the first terminal device is located is the first terminal device;
sending, by the first terminal device, the wireless network information to a second terminal device in a near field communication (NFC) manner, wherein the NFC manner is established at least in part by an activation indication that is sent between the first terminal device and the second terminal device when a distance between the first terminal device and the second terminal device falls within an NFC range;
receiving, by the first terminal device, a first request message that is sent by the second terminal device according to the wireless network information; and
establishing a wireless network connection to the second terminal device according to the first request message, wherein before sending, by the first terminal device, the wireless network information to the second terminal device in the NFC manner, the method further comprises one of the following methods:

enabling, by the first terminal device, an application function option of NFC, and when the distance between the first terminal device and the second terminal device falls within the NFC range, sending, by the first terminal device, a first activation indication to the second terminal device such that the second terminal device enables an application function option of NFC according to the first activation indication; or
when the distance between the first terminal device and the second terminal device falls within the NFC range, receiving, by the first terminal device, a second activation indication sent by the second terminal device, wherein the second terminal device is a terminal device for which an application function option of NFC is enabled, and enabling, by the first terminal device, an application function option of NFC according to the second activation indication.

2. The method according to claim 1, wherein before receiving, by the first terminal device, the first request message that is sent by the second terminal device according to the wireless network information, the method further comprises:
receiving, by the first terminal device, identifier information of the second terminal device that is sent by the second terminal device in the NFC manner; and
adding the identifier information of the second terminal device to a whitelist,
wherein the first request message further comprises the identifier information of the second terminal device, and
wherein establishing the wireless network connection to the second terminal device according to the first request message specifically comprises performing matching, by the first terminal device, in the whitelist according to the identifier information of the second terminal device, and when the matching succeeds, establishing the wireless network connection to the second terminal device according to the first request message.

3. The method according to claim 1, wherein after sending, by the first terminal device, the wireless network information to the second terminal device in the NFC manner, the method further comprises:
receiving, by the first terminal device, a second request message that is sent by a third terminal device according to wireless network information; and
establishing a wireless network connection to the third terminal device according to the second request message, wherein the wireless network information is obtained by the third terminal device from the second terminal device in the NFC manner.

4. The method according to claim 1, wherein the method further comprises:
sending, by the first terminal device, a network capability collection instruction to one or more other terminal devices on the wireless network on which the first terminal device is located;
receiving, by the first terminal device, respective wireless network capability information that s sent by the one or more other terminal devices according to the network capability collection instruction;
determining, by the first terminal device according to the received wireless network capability information, that one terminal device serves as a new first terminal device, wherein the new first terminal device serves as a new access point; and
sending, by the first terminal device, indication information to the one or more other terminal devices, wherein the indication information is used to instruct the one or more other terminal devices to establish a wireless network connection to the new first terminal device.

5. The method according to claim 1, wherein obtaining, by the first terminal device, the wireless network information specifically comprises one of the following methods:

obtaining, by the first terminal device, wireless network information that is generated by the first terminal device in real time; and obtaining, by the first terminal device, wireless network information that is stored on the first terminal device, wherein the wireless network information is stored after being generated by the first terminal device.

6. A wireless network connection establishment method, comprising:

receiving, by a second terminal device, wireless network information that is sent by a first terminal device in a near field communication (NFC) manner, wherein the NFC manner is established at least in part by an activation indication that is sent between the first terminal device and the second terminal device when a distance between the first terminal device and the second terminal device fails within an NFC range, wherein the wireless network information is used to join a wireless network on which the first terminal device is located, and wherein an access point of the wireless network on which the first terminal device is located is the first terminal device; and sending, by the second terminal device, a first request message to the first terminal device according to the wireless network information such that the first terminal device establishes a wireless network connection to the second terminal device according to the wireless network information, wherein before receiving, by the second terminal device, the wireless network information that is sent by the first terminal device in the NFC manner, the method further comprises one of the following methods:

when the distance between the second terminal device and the first terminal device falls within the NFC range, receiving, by the second terminal device, a first activation indication sent by the first terminal device, wherein the first terminal device is a terminal device for which an application function option of NFC is enabled, and enabling, by the activation indication; or enabling, by the second terminal device, an application function option of NFC, and when the distance between the second terminal device and the first terminal device falls within the NFC range, sending, by the second terminal device, a second activation indication to the first terminal device such that the first terminal device enables an application function option of the NFC according to the second activation indication.

7. The method according to claim 6, wherein before sending, by the second terminal device, the first request message to the first terminal device according to the wireless network information, the method further comprises:

sending, by the second terminal device, identifier information of the second terminal device to the first terminal device in the NFC manner such that the first terminal device adds the identifier information of the second terminal device to a whitelist, wherein the first request message further comprises the identifier information of the second terminal device; and performing matching, by the first terminal device, in the whitelist according to the identifier information of the second terminal device, and when the matching succeeds, establishing the wireless network connection to the second terminal device according to the first request message.

8. The method according to claim 6, wherein after receiving, by the second terminal device, the wireless network information that is sent by the first terminal device in the NFC manner, the method further comprises sending, by the second terminal device, the wireless network information to a third terminal device in the NFC manner such that the first terminal device receives a second request message that is sent by the third terminal device according to the wireless network information, and establishes a wireless network connection to the third terminal device according to the second request message.

9. The method according to claim 6, wherein the method further comprises:

receiving, by the second terminal device, a network capability collection instruction sent by the first terminal device;

sending, by the second terminal device, wireless network capability information to the first terminal device according to the network capability collection instruction;

receiving, by the second terminal device, an indication information sent by the first terminal device;

establishing, by the second terminal device, a wireless network connection to one or more other terminal devices on the wireless network according to the indication information when the second terminal is a new access point; and establishing, by the second terminal device according to the indication information, a wireless network connection to the terminal device that is determined as the new access point when the one or more other terminal devices except the second terminal device is the new access point.

10. A terminal device, comprising: a first processor;
a first near field communication (NFC) communicator; and
a first radio frequency device,
wherein the first processor is configured to:
obtain wireless network information, wherein the wireless network information is used to join a wireless network on which the terminal device is located, and wherein an access point of the wireless network on which the terminal device is located is the terminal device; and
establish a wireless network connection between the first radio frequency device and a second terminal device according to a first request message sent by the second terminal device,
wherein the first NFC communicator is configured to send the wireless network information to the second terminal device in an NFC manner,
wherein the NFC manner is established at least in part by an activation indication that is sent, between the terminal device and the second terminal device when a distance between the terminal device and the second terminal device falls within an NFC range,
wherein the first radio frequency device is configured to receive the first request message that is sent by the second terminal device according to the wireless network information, and
wherein before the first NFC communicator sends the wireless network information to the second terminal device in the NFC manner, the first processor is further configured to:

enable, by the terminal device, an application function option of NFC, and when the distance between the terminal device and the second terminal device falls within the NFC range, send, by the terminal device, a first activation indication to the second terminal device such that the second terminal device enables an application function option of NFC according to the first activation indication; or when the distance between the terminal device and the second terminal device falls within the NFC range, receive, by the terminal device, a second activation indication sent by the second terminal device, wherein the second terminal device is a terminal device for an application function option of NFC according to the second activation indication.

11. The terminal device according to claim 10, wherein the first NFC communicator is further configured to receive identifier information of the second terminal device that is sent by the second terminal device in the NFC manner, wherein the first processor is further configured to add the identifier information of the second terminal device to a whitelist, wherein the first request message further comprises the identifier information of the second terminal device, and wherein the first processor is specifically configured to perforin matching in the whitelist according to the identifier information of the second terminal device, and when the matching succeeds, establish a wireless network connection to the second terminal device according to the first request message.

12. The terminal device according to claim 10, wherein the first radio frequency device is further configured to receive a second request message that is sent by a third terminal device according to wireless network information, wherein the wireless network information is obtained by the third terminal device from the second terminal device in the NFC manner, and wherein the first processor is further configured to establish a wireless network connection to the third terminal device according to the second request message.

13. The terminal device according to claim 10, wherein the first radio frequency device is further configured to send a network capability collection instruction to one or more other terminal devices on the wireless network on which the first radio frequency device is located, receive respective wireless network capability information that is sent by the one or more other terminal devices according to the network capability collection instruction, and send indication information generated by the processor to the one or more other terminal devices, and wherein the first processor is further configured to determine, according to the wireless network capability information, that one terminal device serves as a new terminal device and the new terminal device serves as a new access point, and generate the indication information, wherein the indication information is used to instruct the one or more other terminal devices to establish a wireless network connection to the new terminal device.

14. The terminal device according to claim 10, wherein the first processor is specifically configured to:
obtain wireless network information that is generated by the terminal device in real time; or
obtain wireless network information that is stored on the terminal device, wherein the wireless network information is stored after being generated by the terminal device.

15. A terminal device, comprising:
a second processor;
a second near field communication (NFC) communicator; and a second radio frequency device,
wherein the second NFC communicator is configured to receive wireless network information that is sent by a first terminal device in an NFC manner,
wherein the NFC manner is established at least in part by an activation indication that is sent between the terminal device and the first terminal device when a distance between the terminal device and the first terminal device falls within an NFC range,
wherein the wireless network information is used to join a wireless network on which the first terminal device is located,
wherein an access point of the wireless network on which the first terminal device is boated is the first terminal device,
wherein the second processor is configured to generate a first request message according to the wireless network information,
wherein the second radio frequency device is configured to send the first request message to the first terminal device such that the first terminal device establishes a wireless network connection between the second radio frequency device and the first terminal device according to the wireless network information
and wherein before the second NFC communicator receives the wireless network information that is sent by the first terminal device in the NFC manner, the second processor is further when the distance between the terminal device and the first terminal device falls within the NFC range, receive, by the terminal device, a first activation indication sent by the first terminal device, wherein the first terminal device is a terminal device for which an application function option of NFC is enabled, or enable, by the terminal device, an enable, by the terminal device, an application function option of NFC, and when the distance between the terminal device and the first terminal device falls within the NFC range, send, by the terminal device, a second activation indication to the first terminal device such that the first terminal device enables an application function option of the NFC according to the second activation indication.

16. The terminal device according to claim 15, wherein the second NFC communicator is further configured to send identifier information of the terminal device to the first terminal device in the NFC manner such that the first terminal device adds the identifier information of the terminal device to a whitelist, wherein the first request message further comprises the identifier information of the terminal device, and wherein the first terminal device is further configured to perform matching in the whitelist according to the identifier information of the terminal device, and when the matching succeeds, establishing a wireless network connection to the terminal device according to the first request message.

17. The terminal device according to claim 15, wherein the second NFC communicator is further configured to send the wireless network information to a third terminal device in the NFC manner such that the first terminal device receives a second request message that is sent by the third terminal device according to the wireless network information, and establishes a wireless network connection to the third terminal device according to the second request message.

18. The terminal device according to claim 15, wherein the second radio frequency device is further configured to receive a network capability collection instruction sent by the first terminal device, send wireless network capability information obtained by the second processor to the first terminal device, and receive indication information sent by the first terminal device, wherein the indication information is sent after the first terminal device determines, according to the received wireless network capability information, that one terminal device serves as a new first terminal device, and the new first terminal device serves as a new access point, and wherein the second processor is further configured to obtain wireless network capability information of the terminal device according to the network capability collection instruction, establish a wireless network connection to one or more other terminal devices on the wireless network according to the indication information when the terminal device is the new access point, and establish, according to the indication information, a wireless network connection to the terminal device that is determined as the new access point when the one or more other terminal devices except the terminal device is the new access point.

* * * * *